United States Patent [19]
Johansson

[11] Patent Number: 5,497,954
[45] Date of Patent: Mar. 12, 1996

[54] LINE SPOOL FOR A FISHING REEL

[75] Inventor: Arne Johansson, Mörrum, Sweden

[73] Assignee: Abu AB, Svängsta, Sweden

[21] Appl. No.: 268,127

[22] Filed: Jul. 6, 1994

[51] Int. Cl.⁶ .................................................. A01K 89/00
[52] U.S. Cl. ...................... 242/322; 242/118.7; 242/602.1
[58] Field of Search .................................... 242/322, 613, 242/613.2, 18 PW, 118.4, 118.7, 602.1

[56] References Cited

U.S. PATENT DOCUMENTS

| 2,282,156 | 5/1942 | Benes ................................. 242/322 X |
| 3,266,748 | 8/1966 | Le Bus ................................. 242/613 X |
| 3,503,275 | 3/1970 | Morse ................................. 242/118.4 X |
| 3,851,830 | 12/1974 | Barthalon ........................ 242/118.4 X |
| 5,067,665 | 11/1991 | LoStracco et al. .............. 242/118.4 X |

FOREIGN PATENT DOCUMENTS

| 765748 | 6/1934 | France ................................. 242/118.4 |
| 1035994 | 9/1955 | France ................................. 242/613.2 |
| 709374 | 7/1941 | Germany ............................. 242/118.7 |

Primary Examiner—Joseph J. Hail, III
Attorney, Agent, or Firm—Browdy and Neimark

[57] ABSTRACT

A line spool for use in a fishing reel has two side plates and an intermediate hub which is connected to the side plates and on which a fishing line is to be wound. The hub has a line-receiving, helical circumferential groove which has a small pitch and extends at least one turn around the hub.

7 Claims, 1 Drawing Sheet

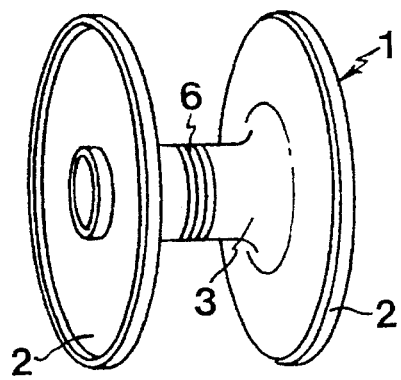
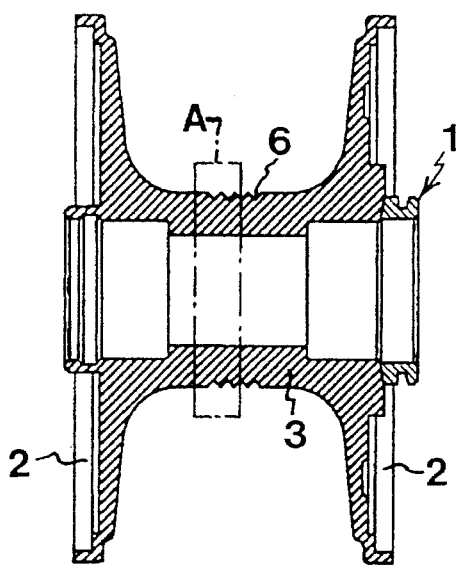
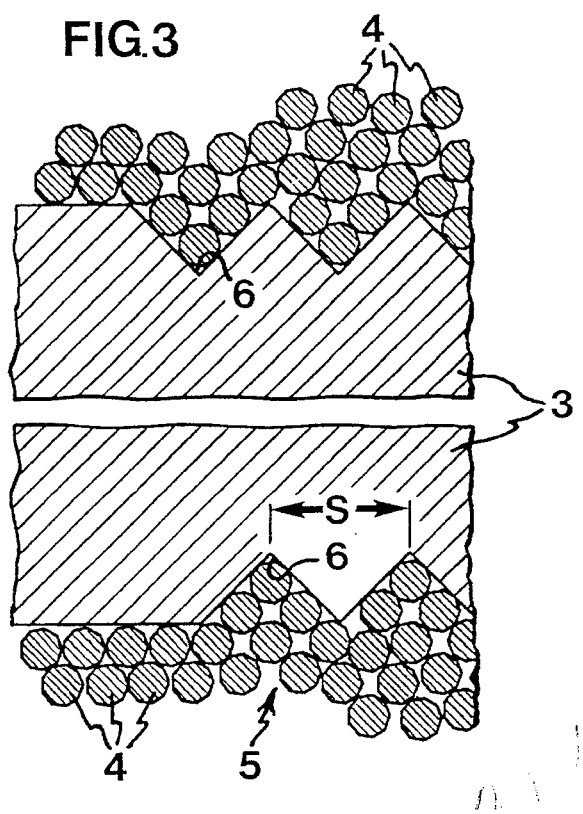

5,497,954

LINE SPOOL FOR A FISHING REEL

BACKGROUND OF THE INVENTION

The present invention relates to a line spool for use in a fishing reel.

In many prior-art fishing reels, especially fishing reels of the multiplier type, the line spool is formed as an integral piece and has two side plates and an intermediate hub. A fishing line is wound on the line spool. When a bait attached to the fishing line is cast, part of the line is unwound from the line spool to be wound on it again by turning the spool by means of a handle.

In present-day reels, the fishing lines employed usually consist of nylon. However, fishing lines of Kevlar®, which can be made thinner and thus require less space than a nylon line and yet are equally strong, are today employed to an increasing extent, especially in fishing situations requiring strong lines. A nylon line is elastic and thus extensible, whereas a line of Kevlar® is comparatively stiff and thus inextensible. This difference in quality is of particular consequence when the line is to be wound on the spool by means of the handle while at the same time being subjected to a braking tractive force, e.g. as a result of a fish having caught the bait or as a result of the hook having got stuck on the sea bottom. A line package consisting of a nylon line on the line spool then is pinched to the spool hub thanks to the elasticity of the line, and will thus be entrained in the rotation of the spool, so that a line-retrieving force can be exerted on the line by rotating the handle. A line package consisting of a Kevlar® line on the line spool is however not pinched to the spool hub, which, when turning the handle, makes the hub rotate in slipping fashion within the line package if a braking tractive force acts on the line.

SUMMARY OF THE INVENTION

The object of the present invention is to provide a line spool which is so designed as to overcome this problem.

According to the invention, this object is achieved by means of a line spool intended for use in a fishing reel and having two side plates and an intermediate hub which is connected to said side plates and on which a fishing line is to be wound, said hub having a line-receiving, helical circumferential groove which has a small pitch and extends at least one turn around the hub.

In a preferred embodiment, the circumferential groove extends several turns around the hub.

Suitably, the circumferential groove has V-shaped cross-section.

BRIEF DESCRIPTION OF THE DRAWINGS

The invention will now be described in more detail with reference the accompanying drawings, in which:

FIG. 1 shows a line spool according to the invention in perspective,

FIG. 2. shows the line spool in axial cross-section, and

FIG. 3 shows the line-spool portion A, framed in FIG. 2, on a larger scale with a fishing line wound on it.

DESCRIPTION OF THE PREFERRED EMBODIMENT

In the drawings, a line spool 1 is designed, by turning, as an integral piece of aluminum. The line spool 1 has two side plates 2 and an intermediate hub 3, on which a fishing line 4 (FIG. 3) is to be wound.

The illustrated line spool 1 is intended in particular for use in a fishing reel (not shown) of the multiplier type, the fishing line 4 being wound on the hub 3 of the spool 1. When a bait (not shown) attached to the fishing line 4 is cast, part of the line is paid out from the line spool 1. This part of the fishing line 4 is again wound in known manner on the line spool 1 by rotating the line spool with the aid of a handle (not shown).

The fishing line 4 here is a stiff, i.e. inelastic, line of e.g. Kevlar®. To overcome the above-mentioned drawback inherent in prior-art line spools, namely that the hub 3 rotates slippingly within the line package 5 formed by the stiff fishing line 4 on the line spool 1 when the handle is turned for winding the line 4 and a braking tractive force is at the same time acting on the line, the hub 3 of the line spool 1 has been provided with a line-receiving, helical circumferential groove 6 which extends through at least one turn around the hub 3. In the illustrated embodiment, the groove 6 extends about four turns around the hub.

When the handle is turned for winding a reeled-off part of the fishing line 4 on the line spool 1 against the action of a braking tractive force exerted on the line, produced e.g. by a fish having caught the bait, the parts of the line received in the groove 6 will be wedged fairly promptly as a result of the helical shape of the groove if the hub 3 tends to rotate within the line package 5. In this manner, a non-rotatable connection is provided between the line spool 1 and the line package 5.

The helical groove 6 has a small pitch, which here means that the pitch is so small that the fishing line 4, when initially wound on the bare line spool 1, should be received in the groove and not cross it. In the latter case, the aforementioned aimed-at effect will of course not be achieved.

Preferably, the groove 6 has V-shaped cross-section, the V-angle suitably being 90° or less. In the illustrated embodiment, the V-angle is 90°, which is a preferred angle for reasons of manufacture. The pitch of the groove 6, here defined as the distance S (FIG. 3) between two adjacent groove bottoms, is 1 mm in the illustrated embodiment, which is a suitable value for line diameters of about 0.1–about The shape and the dimensions of the groove 6 may of course be adapted to the fishing line used.

What is claimed is:

1. A fishing reel including a fishing reel spool and a fishing line, the fishing line having a line diameter, the fishing reel spool incorporating a hub and two side plates, the hub being intermediate the two side plates, the hub having a generally cylindrical hub surface;

wherein the improvement comprises:

a helical circumferential groove in the hub surface;

the groove including a pitch sufficiently small that the fishing line having the line diameter is received within the groove;

the groove extending at least one turn around the hub.

2. The fishing reel as claimed in claim 1, wherein the circumferential groove extends several turns around the hub.

3. The fishing reel as claimed in claim 1, wherein the circumferential groove has V-shaped cross-section.

4. A structure for preventing slipping between a fishing line package and a cylindrical fishing reel spool of a fishing reel, the fishing line package being formed of turns of an inelastic fishing line wound about the cylindrical fishing reel spool, the line having a diameter, the cylindrical fishing line spool having a surface, the structure comprising:

means for preventing slipping of the fishing line package on the spool surface when the fishing line is wound about the spool surface, said means comprising an encircling helical groove in the spool surface, the groove having a pitch greater than the fishing line diameter such that the fishing line lies in the groove.

5. The structure according to claim 4 wherein the groove includes a V-shape.

6. The structure according to claim 4, wherein the V-shape comprises an included angle substantially equal to or less than 90 degrees.

7. A structure for preventing slipping between a fishing line package and a cylindrical fishing reel spool, the fishing line package being formed of turns of an inelastic fishing line wound about the cylindrical fishing reel spool, the line having a diameter, the cylindrical fishing line spool having a surface, the structure comprising:

means for preventing slipping of the fishing line package on the spool surface when the fishing line is wound about the spool surface, said means comprising an encircling helical groove in the spool surface, the groove having a pitch greater than the fishing line diameter such that the fishing line lies in the groove;

wherein the groove includes a V-shape;

wherein the V-shape comprises an included angle substantially equal to or lease than 90 degrees; and wherein the pitch is between 1.67 and 10.0 times the line diameter.

\* \* \* \* \*